United States Patent [19]
Wilkes et al.

[11] 3,749,003
[45] July 31, 1973

[54] SEED COTTON HANDLING APPARATUS

[75] Inventors: Lambert H. Wilkes, College Station, Tex.; Joseph K. Jones, Raleigh, N.C.

[73] Assignee: Cotton, Incorporated, New York, N.Y.

[22] Filed: May 16, 1972

[21] Appl. No.: 253,877

[52] U.S. Cl. .................. 100/35, 100/100, 100/218, 100/226, 100/247, 100/255, 100/288, 214/9
[51] Int. Cl. ............................................ B30b 13/00
[58] Field of Search .................. 214/9, 394; 100/35, 100/100, 218, 226, 288, 229, 246, 248, 252, 255, 3

[56] References Cited
UNITED STATES PATENTS

| | | | |
|---|---|---|---|
| 430,737 | 6/1890 | Honaker et al. ................ | 100/226 X |
| 2,782,710 | 2/1957 | Fishburne ........................... | 100/100 |
| 3,463,079 | 8/1969 | Corbett ............................ | 100/288 X |
| 3,691,967 | 9/1972 | Mettetal ............................ | 100/100 |
| 3,703,966 | 11/1972 | Jones ................................... | 214/9 |

FOREIGN PATENTS OR APPLICATIONS

| | | | |
|---|---|---|---|
| 195,610 | 2/1958 | Austria ............................... | 100/226 |
| 137,472 | 6/1950 | Australia ............................ | 100/100 |

*Primary Examiner*—Billy J. Wilhite
*Attorney*—Robert S. Swecker

[57] ABSTRACT

Apparatus and method are disclosed for temporarily storing cotton after harvesting. The apparatus includes a box frame which is open at the top and the bottom is closed by a pallet. The apparatus includes a carriage which is mounted for movement longitudinally along the top of the frame. The carriage includes a vertically reciprocating compaction head which serves the dual purpose of spreading the cotton horizontally in the frame and compressing the cotton against the pallet. The frame also has retractable wheels on opposite sides to raise the frame from the pallet, and to allow the frame to move longitudinally relative to the pallet. The compressed cotton on the pallet passes through a doorway in the rear of the frame as the frame advances.

16 Claims, 11 Drawing Figures

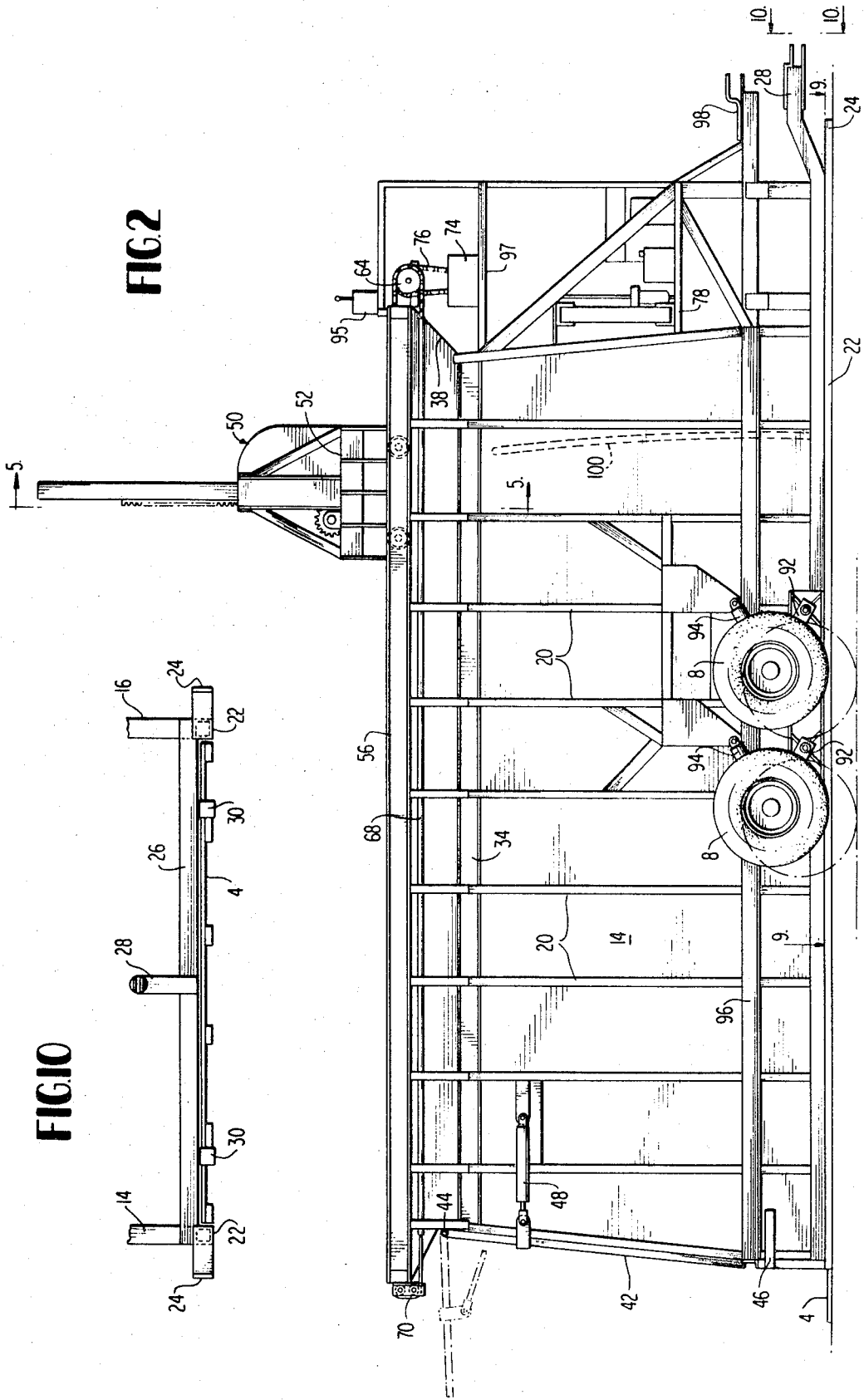

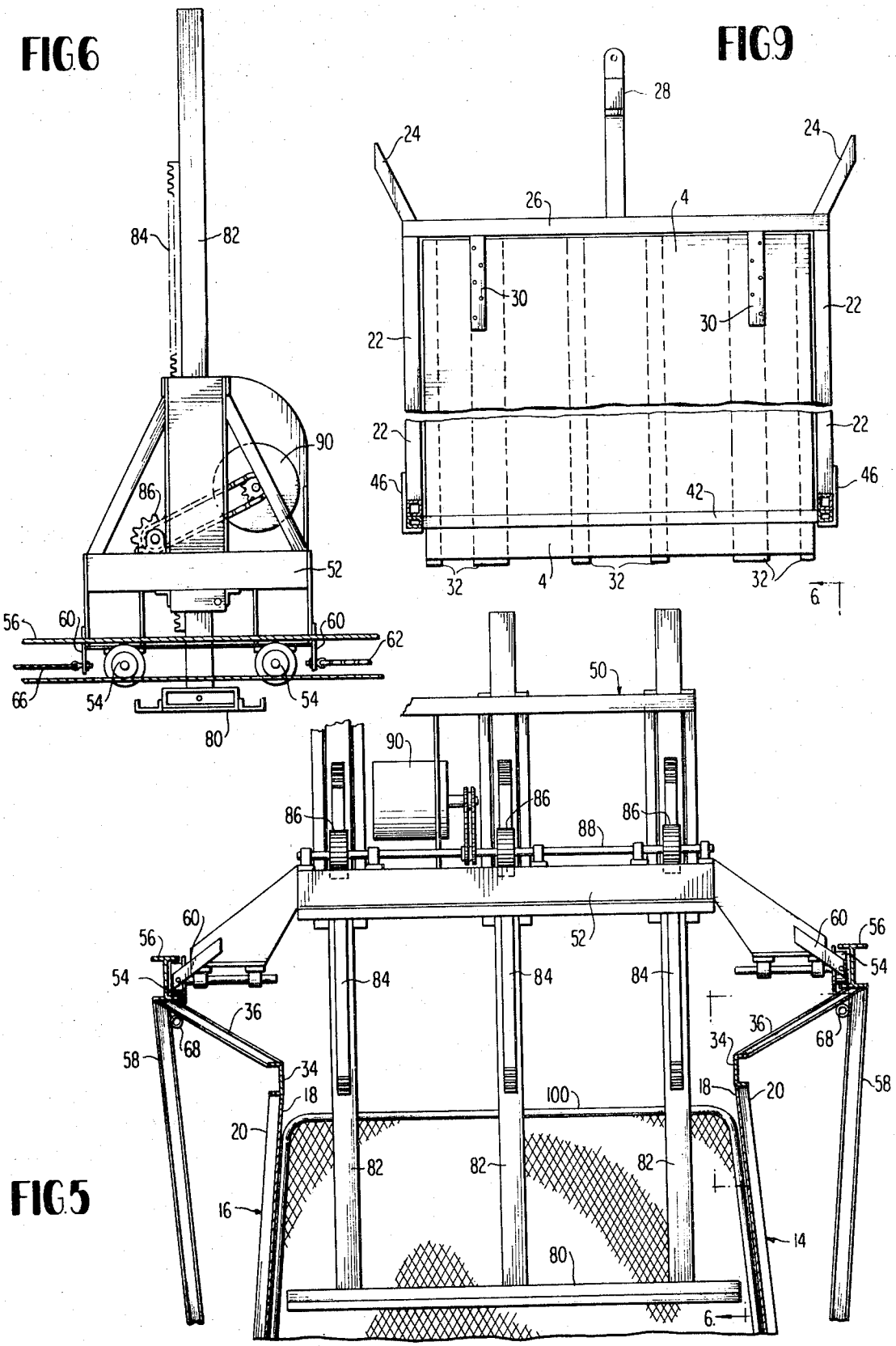

SEED COTTON HANDLING APPARATUS

BACKGROUND OF THE INVENTION

This invention relates to crop handling methods and apparatus, and more particularly, to apparatus for temporarily storing seed cotton and similar materials.

Cotton is usually picked by a mechanical harvester which is driven along the row of cotton plants. The harvested cotton is collected in a large basket or bin on the harvester. When the basket is filled, the cotton is dumped into a wagon and transported to the gin for subsequent processing. Since the seed cotton is transported to the gin soon after it is picked, the gins are operated at full capacity during the harvesting season, but this season is relatively short and the gin remains idle between ginning seasons.

Various attempts have been made to handle the seed cotton more efficiently. For example, it has been proposed to include compactors in the basket on the harvester to reduce the bulk of the seed cotton. This allows the harvester to operate for longer periods before dumping the basket, but it does not overcome the problem of seasonal variations in the operation of the gin.

The use of a slip form to stack or rick cotton on the ground in the fields as a means for temporary storage has been attempted in the past. The slip form is a rectangular box-like container which is open at the top and bottom and is open also at one end. Seed cotton is dumped from a harvester into the top of the form. Laborers inside the form tramp the cotton down after each load is dumped from the harvester. When the form has been filled in this manner, the form is pulled endwise over the ground, leaving behind a stack or rick of cotton extending through the open end of the form. The process is repeated until a rick of the desired size has been produced.

Although the use of the slip form permits the cotton to be stored in the field, laborers are required to tramp the cotton in the form. Also, the compaction of the cotton in the rick is usually of a low density and is uneven. This causes the rick to have a low degree of integrity and the rick tends to come apart easily. Subsequently, the cotton in the rick is taken out of the rick by manual means and transported to the gin by trucks. The savings in the cost of ginning resulting from the extension of the ginning season, therefore, are reduced by the additional cost of loading the cotton from the rick and transporting the cotton to the gin.

Another proposal to improve efficiency in handling the harvested cotton is to support a pallet on a trailer. Movable sides on the trailer serve as a form for containing the seed cotton as it is dumped into the trailer. Tramping of the cotton is done by manual labor. The pallet may be unloaded from the trailer by tilting the bed of the trailer, after moving the sides outwardly. This process produces only light compaction of the cotton and does not reduce its bulk sufficiency. Also, labor costs are not appreciably reduced.

SUMMARY OF THE INVENTION

In view of the inefficiencies involved in handling seed cotton by conventional techniques, it is an object of this invention to provide an effective method and apparatus for temporarily storing the seed cotton in condition for subsequent processing.

It is a further object of this invention to provide a method and apparatus utilizing less labor and equipment for unloading the cotton from the harvester, temporarily storing the cotton, and subsequently transporting the cotton to the gin.

Another object of the invention is to provide a method and apparatus for storing seed cotton for long periods of time without deterioration.

These objects are accomplished in accordance with a preferred embodiment of the invention by compressing the seed cotton received from the harvester into a module formed on a pallet. The pallet facilitates subsequent handling of the module. The apparatus includes a box frame having an open top and bottom. A pallet forms a closure for the bottom of the frame. The cotton is deposited in the frame through the top opening. A carriage extends across the top opening and is mounted on rails for longitudinal movement between the opposite ends of the frame. The carriage includes a compaction head which is movable in opposition to the pallet to compress the cotton against the pallet. The compaction head also spreads the cotton horizontally in the frame as the carriage moves along the sides.

The apparatus also includes a door at the rear of the frame and wheels at opposite sides of the frame. The wheels may be lowered to lift the frame relative to the pallet. When the wheels are lowered, the frame may be pulled longitudinally by a tractor, while the pallet remains stationary. Before moving the frame, the door is opened to allow the compressed cotton module to pass through the opening at the rear of the frame.

DESCRIPTION OF THE DRAWINGS

This preferred embodiment is illustrated in the accompanying drawings in which:

FIG. 2 is a side elevational view of the frame positioned on the pallet in preparation for receiving a supply of cotton;

FIG. 5 is a cross-sectional view of the apparatus along the line 5—5 in FIG. 2;

FIG. 6 is a cross-sectional view of the apparatus along the line 6—6 in FIG. 5;

FIG. 9 is a cross-sectional view of the frame along the line 9—9 in FIG. 2;

FIG. 10 is a cross-sectional view of the frame along the line 10—10 in FIG. 2.

DESCRIPTION OF THE PREFERRED EMBODIMENT

Figure 1:
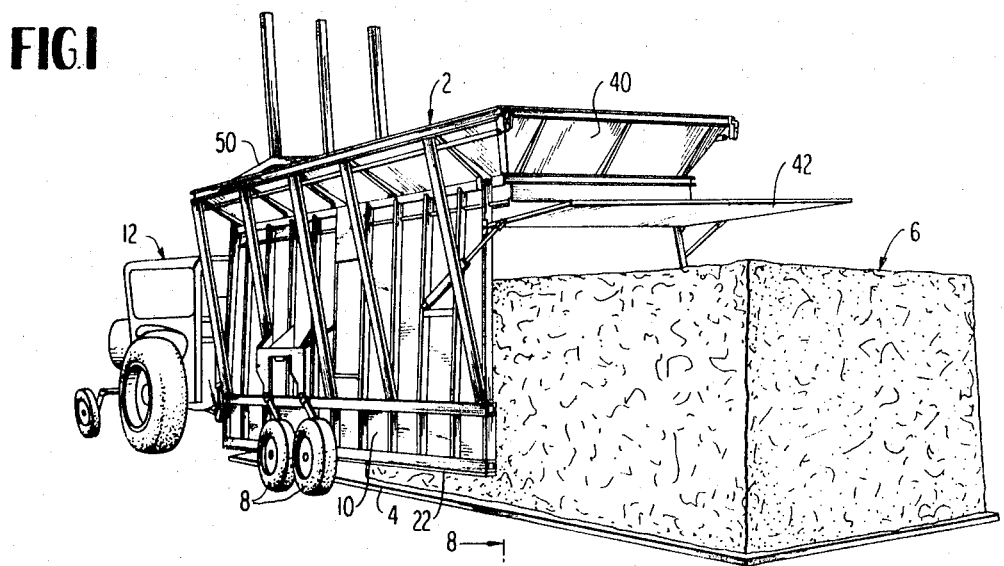
FIG. 1 is a perspective view of the apparatus according to this invention showing the frame raised above the pallet.
Figure 7:
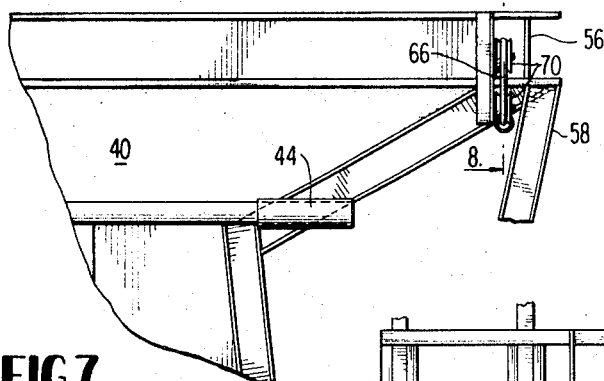
FIG. 7 is a cross-sectional view of the end of the frame.

Referring to FIG. 1, the apparatus 2, which will be referred to as the module builder, cooperates with a pallet 4 which rests on the ground to produce a module 6 of compressed cotton on the pallet 4. The module builder 2 is shown in FIG. 1 with its retractable wheels 8 lowered, thereby allowing the box frame 10 to be pulled by the tractor 12 relative to the module 6.

The frame 10 includes walls 14 and 16 which are spaced apart on opposite sides of the frame. The side walls 14 and 16 slope toward each other, so that the walls are closer together at the top of the frame than they are at the bottom of the frame, as shown in FIG. 5. The inside of each side wall preferably has a lining 18 of sheet metal (FIG. 5) to provide a smooth surface. Frame members 20 rigidly support the sheet metal lining 18.

At the bottom of each of the side walls 14 and 16, longitudinal runners 22 are rigidly secured to the frame members 20 to support the frame 10 on the surface of the ground when the wheels 8 are retracted, as shown in FIGS. 2, 9 and 10. A pair of guide members 24 project laterally from the forward end of each runner 22 for guiding the frame 10 relative to the pallet 4. A transverse member 26 is rigidly secured between the side walls 14 and 16 to maintain the spacing between the runners 22. The transverse member 26 is spaced above the bottom of the runners 22, (shown in FIG. 10) to allow the pallet 4 to pass under the member 26 as the frame moves forwardly relative to the pallet. A hitch member 28 projects forwardly from the transverse member 26 for attachment to the drawbar of the tractor 12.

The pallet 4 preferably has a width slightly less than the distance between the runners 22 and may have any convenient length. The pallet 4, as shown in FIGS. 9 and 10, has brackets 30 secured at the front end for hoisting the pallet onto a flat bed truck or trailer. The pallet should be sufficiently flexible to allow loading and unloading of the pallet while supporting a module 6. Preferably, the pallet 4 has an upper skin 31 of plywood, reinforced by longitudinal wood members 32 secured under the plywood, to form a continuous pallet. The pallet should be at least as long as the frame 10.

At the top of the side walls 14 and 16 a pair of longitudinal frame members 34 define a top opening through which the seed cotton passes into the interior of the frame 10. Deflector panels 36 project outwardly from the frame members 34 to guide the seed cotton into the opening between the members 34. Deflector panels 38 and 40 are also provided at the front and rear end, respectively, of the top opening.

Figure 3:
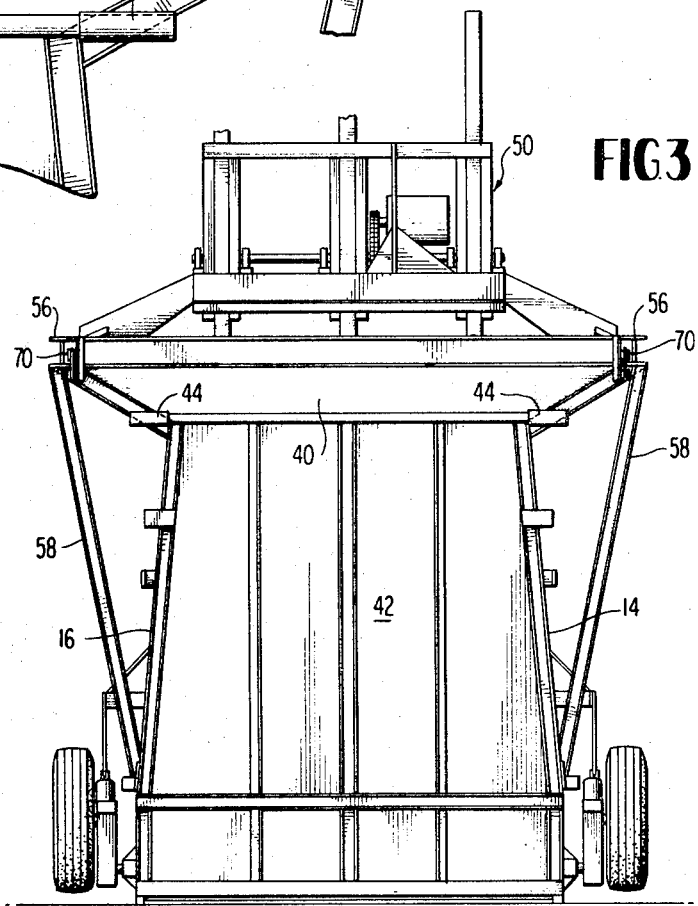
FIG. 3 is a rear elevational view of the frame.

At the rear of the frame 10, a door 42 is mounted on hinges 44, as shown in FIGS. 2 and 3. Guides 46 on opposite sides of the door 42 engage the side walls 14 and 16 to prevent the sides from moving apart when the door is closed. The door is held closed by the hydraulic rams 48 on opposite sides of the frame 10. The door 42 may be opened by means of the rams 48. The door 42 swings upwardly to the position shown in dotted lines in FIG. 2.

The module builder 2 also includes a carriage 50 having a platform 52 extending across the width of the frame 10. The platform 52 is supported on flanged wheels 54 which engage rails 56 which are rigidly mounted along the top of the deflector panels 36. Struts 58 mounted on the outside of the walls 14 and 16 provide additional support for the rails 56.

Figures 4, 8, 11:
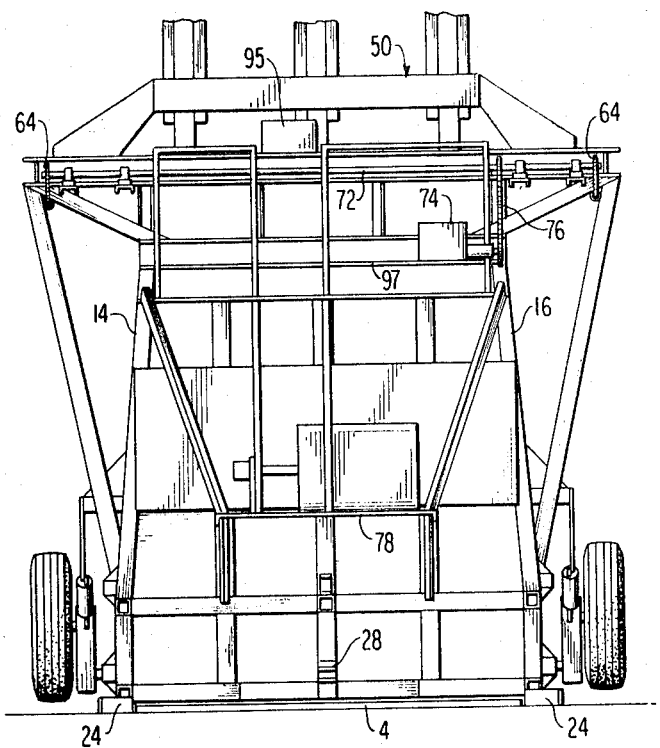
FIG. 4 is a front elevational view of the frame.
FIG. 8 is a detail elevational view of the end of the frame along the line 8—8 in FIG. 7.
FIG. 11 is a cross-sectional view of the apparatus corresponding to FIG. 5, but showing a modified carriage and rail arrangement.

The wheels 54 roll along the rails 56, thereby permitting the carriage 50 to move from the front end of the frame 10 to the rear end of the frame adjacent the door 42. Guards 60 project outwardly from the platform 52 into the path of the wheels 54 to remove any cotton that may have accumulated on the rails 56 as the carriage moves along the rails. The guards 60 also serve as brackets for attaching a pair of drive chains 62 (FIG. 6) to the carriage. The drive chains 62 pass over sprocket wheels 64 at the front end of each rail 56 (FIG. 2 and 4). The opposite end of the chains 62 are connected with cables 66 and the end of each cable 66 is secured to the corresponding guard 60 at the rearward side of the platform 52. The length of the chain 62 on each side of the carriage 50 corresponds to the length of the rail 56 and is at least as long as one half the combined length of the chain and the cable. At each side of the frame, the chain and cable pass through a pipe 68 which is mounted under the rail 56. A pair of sheaves 70 at the rear end of each rail 56 guide the cable from the pipe 68 into the interior of the rail 56 where the cable joins the guard 60.

The sprocket wheels 64 are mounted on a rotary shaft 72 at the front of the frame 10. A reversible hydraulic motor 74 drives the shaft 72 by means of a drive chain 76. A hydraulic pump driven by a gasoline engine or other source of power is mounted on the platform 78 at the front end of frame 10. The pump supplies hydraulic fluid to operate the various components of the apparatus.

The carriage 50 also includes a movable platen 80 which is suspended below the platform 52 by bars 82 which extend through vertical guides in the platform 52. Each bar has a rack 84 which meshes with a pinion gear 86 secured on a drive shaft 88 which is mounted on the platform 52. The shaft 88 is selectively driven by a reversable hydraulic motor 90, which is also mounted on the platform 52. By operating the motor 90, the platen 80 may be selectively raised and lowered. After a load of cotton has been dumped into the interior of the frame 10, the platen 80 may be lowered, for example, to the position shown in FIG. 5 and by operating the motor 74, the carriage may be moved along the rail 56 to rake the cotton toward the front or the back, thereby leveling the cotton. The carriage 50 may then be held stationary while operating the motor 90 to urge the platen 80 downwardly in order to compress the cotton against the pallet 4.

The wheels 8 of the module builder 2 are retracted while the cotton is being dumped into the frame to form a module. Each wheel is mounted on a pivoted arm 92. Double acting hydraulic rams 94 are connected between the side wall of the frame 10 and the respective arms 92 to raise and lower the wheels 8. When the wheels 8 are lowered, the frame 10 is lifted off of the ground and raised relative to the pallet 4 until it is in the position shown in FIG. 1. The module builder 2 may then be moved to another location. Suitable controls indicated generally at 95 are provided above the platform 97 to control the operation of the various components of the apparatus.

Referring to FIG. 2, the module builder is designed to be used either with mechanical strippers or mechanical pickers. In areas where strippers are used, the cotton is dumped at a higher elevation from the basket on the stripper and the height of the rails 56 allows dumping from the mechanical strippers. In areas where pickers are used, the rails 56 must be lower to accommodate the height of the gasket on the mechanical pickers. In order to lower the height of the rail, the lower portion of the sidewalls 14 and 16 below the longitudinal members 96 may be unbolted, thereby allowing the members 96 to rest on the ground in the same manner as the runners 22. When the lower portion of the frame is removed, the hitch 98 takes the place of the hitch 28. Thus, the apparatus can be used either in picker areas or stripper areas.

In preparation for using the module builder 2, the wheels 8 are lowered to permit the unit to be pulled by a tractor 12 to the desired location in the cotton field. The pallet 4 is placed on the ground and when the module builder is aligned with the pallet but spaced from the rearward end of the pallet, the wheels 8 are retracted, thereby causing the runners 22 to rest on the ground and support the frame 10. The frame is then pulled forward by the tractor, with the guides 24 engaging the rear end of the pallet 4 to guide it between the runners 22. The frame 10 continues to move forward until the rear end of the pallet extends beyond the door 42, so that the pallet covers the entire bottom opening in the frame. A removable gate or screen 100 may be installed between the walls 14 and 16 at the front of the frame to control the length of the module, if the desired length is less than that of the module builder.

When the baskets on the mechanical harvesting machines are filled, the machines dump the baskets over the top of the rails 56, so that the cotton passes through the top opening and into the interior of the frame. As the cotton piles up on the pallet 4, the platen 80 may be lowered and the carriage 50 may be traversed along the rails 56 to spread the cotton in level layers on the pallet 4. Periodically, the platen 80 may be lowered under pressure to compress the cotton against the pallet. After compressing the cotton at one location, the carriage is advanced and the platen 80 is again lowered to compress the adjacent portion of cotton. The carriage progresses in this manner stepwise along the length of the frame until all of the cotton has been compressed to form a module on the pallet 4.

When a module of the desired height has been built in the frame 10, the door 42 is opened to the position shown in dotted lines in FIG. 2 and the tractor 12 pulls the frame 10 forwardly a distance corresponding to the remaining length of the pallet in front of the module, provided the pallet originally had a length greater than the length of the frame. Of course, if the length of the pallet corresponds to the length of the frame, then the wheels 8 may be lowered and the module builder 2 may be moved to another location for building a module on another pallet.

A modified form of the preferred embodiment is illustrated in FIG. 11. In this modified form, the sidewalls 14' and 16' correspond to the sidewalls 14 and 16 illustrated in FIGS. 1 to 5. Longitudinal rails 102 are supported at the upper end of each wall 14' and 16', and a carriage 104 is mounted on flanged wheels 106 for movement along the rails 102. The carriage 104 includes a platform 108 which supports a moveable platen 110 by means of vertical bars 112. The bars 112 may be raised and lowered by operation of a reversible hydraulic motor 114 in the same manner as in the carriage 50 shown in FIGS. 5 and 6. Deflector panels 36' extend along opposite sides of the frame to cause the cotton to fall into the opening between the rails 102. The operation of the modified apparatus of FIG. 11 is substantially the same as described with respect to the embodiment of FIGS. 1 to 10.

The module builder of this invention produces a module in which the cotton is compressed to densities as high as 14 pounds per cubic foot. A single module may contain as much as 14,000 pounds of seed cotton.

The pallets are re-usable. The pallets permit the module to be transferred from the ground to a flat bed truck or trailer to be transported to the gin. For example, a cable from a winch at the front of a flat bed truck or trailer may be attached to the brackets 30 at the front of the pallet 4 (FIGS. 9 and 10). By operating the winch, the cable draws the module supporting pallet over the ground toward a ramp extending from the rear of the bed to the ground. While the pallet is moving up the ramp and onto the bed, the pallet flexes progressively at the base of the ramp and the top of the ramp.

The action of the carriage in spreading the cotton into reasonably level layers before compression contributes to the high degree of compression that is achieved. Furthermore, the compression is substantially uniform throughout the length of the module. Furthermore, it has been found that the module has a high degree of integrity and does not readily come apart while it is being transported to the gin.

An important advantage of the method and apparatus of this invention is that the grower is no longer required to transport the cotton directly to the gin. Instead, the cotton may be formed into modules by the module builder 2 and stored in the field, or at some other suitable location, until it is ready to be ginned. The pallet on which the module is supported can be readily pulled onto a trailer and transported to the gin. Since it is no longer necessary to gin all of the cotton as it is picked, the gin operator can schedule his operation over a longer period of time and avoid the seasonal peaks. The use of the module builder also permits the grower to reduce his harvesting turnrow labor force. Thus, this invention permits savings not only in labor costs for the grower, but also in reduced ginning costs because the gin operator can utilize his equipment more efficiently.

While this invention has been illustrated and described in accordance with a preferred embodiment, it is recognized that variations and changes may be made therein without departing from the invention as set forth in the claims.

What is claimed is:

1. Seed cotton handling apparatus comprising:
   frame means having opposite side walls and having openings at the top and bottom of said frame means;
   pallet means extending across said bottom opening; and
   compactor means on said frame means, said compactor means including a platen movable in opposition to said pallet means and movable longitudinally between said side walls, whereby said platen is movable to spread said cotton longitudinally of said frame means and to compress said cotton.

2. The apparatus according to claim 1 wherein said frame means has opposite end walls, one of said end walls including a door extending substantially the entire distance between said side walls and being contiguous with said pallet means.

3. The apparatus according to claim 2 including power means for opening and closing said door, and power means for raising and lowering said platen relative to said pallet means, and power means for advancing said compactor longitudinally of said side walls.

4. The apparatus according to claim 1 wherein said pallet has at least as great a length as said frame means and is longitudinally flexible.

5. The apparatus according to claim 1 wherein said compactor means includes a carriage and supporting means mounting said carriage on said frame means for movement longitudinally of said side walls.

6. The apparatus according to claim 5 wherein said compaction platen is supported on said carriage and said carriage includes means for raising and lowering said platen relative to said pallet means.

7. The apparatus according to claim 6 wherein said raising and lowering means includes a plurality of bars secured on said platen and being received in said carriage, at least one of said bars having a rack, said carriage having a gear engaging said rack, and motor means on said carriage for selectively rotating said gear to raise and lower said platen.

8. The apparatus according to claim 5 wherein said supporting means includes rail extending longitudinally of said frame means adjacent said top opening and said carriage includes wheels engaging said rails, whereby said carriage rolls along said rails.

9. The apparatus according to claim 8 including power means for rolling said carriage along said rails, said power means including a drive chain connected with said carriage for driving the carriage in either direction along said rails, said drive chain extending along one of said rails and a sprocket wheel on said frame means engaging said chain for imparting longitudinal movement to said chain in either longitudinal direction.

10. Seed cotton handling apparatus comprising:
a box frame having opposite side walls and an opening at the top and bottom of the frame, said frame also having a door forming the rear wall of said frame;
carriage means on said frame, means mounting said carriage means across said top opening between said opposite side walls, said carriage means being movable longitudinally of said frame means;
platen means on said carriage means, said platen means being movable in opposition to said bottom opening, and
wheel means on said frame, said wheel means being movable between a ground engaging position and a retracted position.

11. The apparatus according to claim 10 wherein said frame includes ground engaging runners extending along said side walls, said wheel means being raised above said runners when in said retracted position and extending below said runners when in said ground engaging position.

12. The apparatus according to claim 10 wherein said side walls include removable extensions adjacent said bottom opening, whereby the height of said top opening relative to the ground may be changed.

13. A method of storing seed cotton and similar materials comprising:
placing a frame over a pallet, said frame having opposite side walls and an open bottom;
depositing seed cotton into the interior of said frame means between said side walls;
advancing a platen longitudinally between said side walls and through said cotton, thereby leveling said cotton throughout the length of said frame; and
subsequently moving said platen in opposition to said pallet to compress said cotton against said pallet.

14. The method according to claim 13 including advancing said frame longitudinally relative to said pallet after said compressing step.

15. The method according to claim 14 wherein said frame advancing step includes elevating said frame relative to said pallet.

16. The method according to claim 15 including lowering said frame over said pellet after said advancing step and subsequently depositing said seed cotton in said frame and compressing said frame against said pellet.

* * * * *